Oct. 23, 1956    J. E. REESE    2,767,698
SPEED CONTROL SYSTEM
Filed June 2, 1954    2 Sheets-Sheet 1

James E. Reese
INVENTOR.

BY [signatures]
Attorneys

Oct. 23, 1956

J. E. REESE 2,767,698

SPEED CONTROL SYSTEM

Filed June 2, 1954

James E. Reese
INVENTOR.

BY *Clarence A. O'Brien*
*and Harvey B. Jackson*
Attorneys

United States Patent Office 2,767,698
Patented Oct. 23, 1956

2,767,698

SPEED CONTROL SYSTEM

James E. Reese, Ashland, Ky., assignor of forty-three and one-third percent to Ray P. Walters, and twenty-five percent to John T. Hereford, Ashland, Ky.

Application June 2, 1954, Serial No. 434,049

1 Claim. (Cl. 123—102)

This invention relates to a speed control system and more particularly to a device adapted to permit a governor to regulate the speed of a vehicle to a particular speed limit yet which would permit the governor to be by-passed should extra power be needed in emergency conditions.

The primary object of this invention resides in the provision of a speed control system which employs a governor for controlling the rate of flow of fuel to the internal combustion engine of the vehicle. Should, however, it be necessary to provide additional fuel to the engine in conditions of emergency or when it is desired to pass another vehicle, or for other like reasons, means are provided for opening the valve controlled by the governor to permit a maximum flow of fuel.

One of the express purposes of the invention resides in the fact that utilization of this speed control system will reduce violations of traffic laws because governors would normally hold the vehicles below a particular maximum speed limit. However, the safety of the occupants of the vehicle would not be endangered should conditions of emergency arise when additional power would be needed since means are provided for by-passing the governor to permit the maximum speed capable of being achieved by the vehicle and the accompanying maximum acceleration to be attained when necessary.

Still further objects and features of this invention reside in the provision of a speed control system which is simple in construction and installation, capable of being utilized on various existing makes or models of automotive vehicles, and which is simple to adjust.

These, together with the various ancillary objects and features of the invention which will become apparent as the following description proceeds, are attained by this speed control system, a preferred embodiment of which has been illustrated in the accompanying drawings, by way of example only, wherein.

Figure 1:
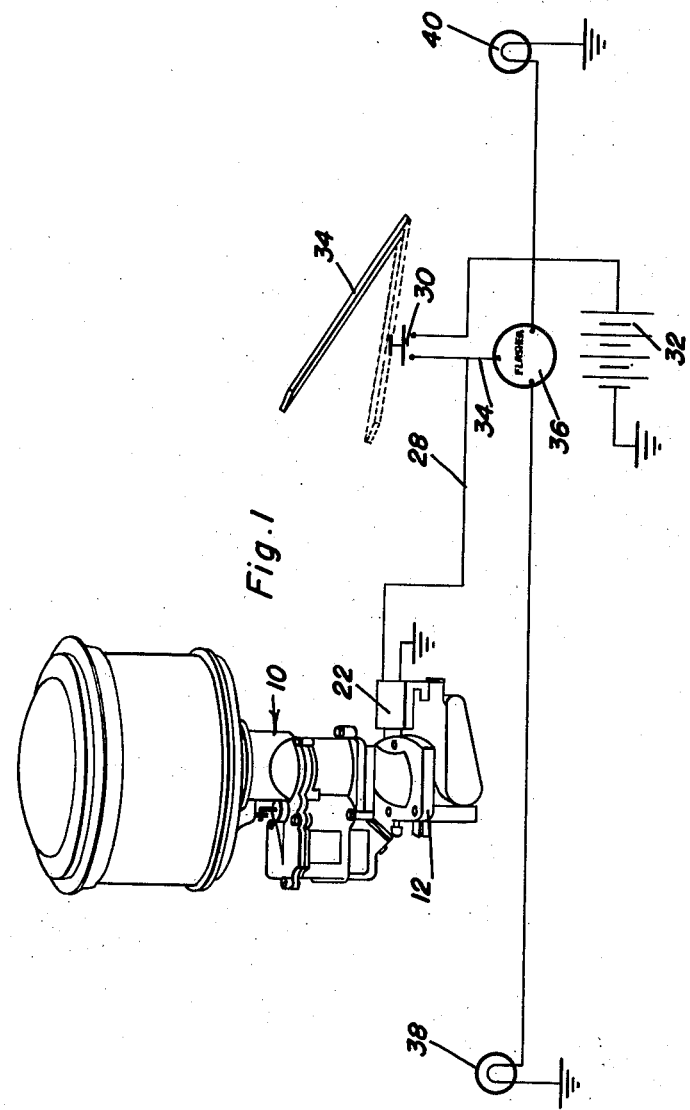
Figure 1 is a schematic diagram of the invention illustrating the component elements thereof.
Figure 2:
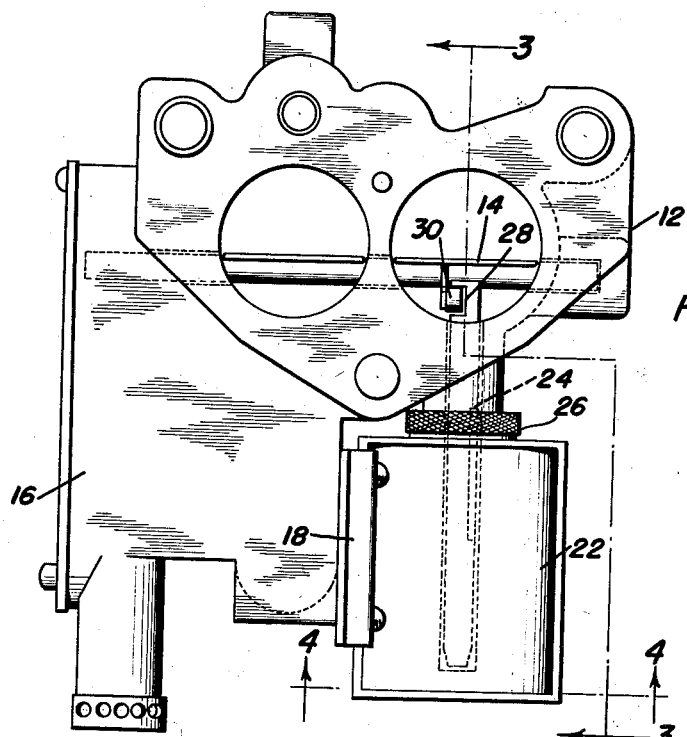
Figure 2 is a top plan view of the installation of component parts of the invention.
Figure 3:
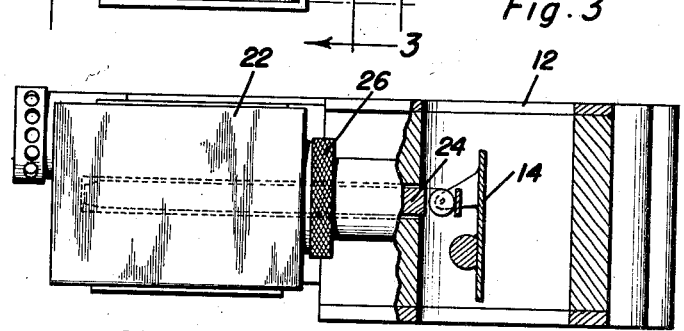
Figure 3 is a vertical sectional view as taken along the plane of line 3—3 in Figure 2.
Figure 4:
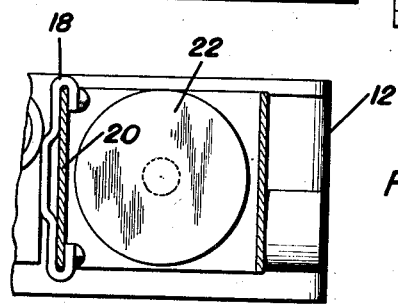
Figure 4 is a sectional detail view as taken along the plane of line 4—4 of Figure 2.

With continuing reference to the accompanying drawings wherein like reference numerals designate similar parts throughout the various views, reference numeral 10 generally designates the carburetor used in conjunction with an internal combustion engine, not shown, as is generally mounted on a motor vehicle. The carburetor 10 is adapted to supply to the internal combustion engine a mixture of fuel and air. A governor 12 in accordance with the concept of this invention is provided for limiting the rate of flow of fuel to the carburetor 10 and thus to the internal combustion engine.

The utilization of a governor 12 restricts the operation of the vehicle to that of a certain predetermined speed limit. However, in certain conditions of emergency it is necessary that the engine of the vehicle be supplied with additional fuel so that additional performance such as increased acceleration or a greater velocity for the vehicle can be obtained.

The governor 12 includes a butterfly valve 14 for controlling the rate of fuel flow to the carburetor 10 and an adjustment mechanism 16 of conventional construction is provided for the butterfly valve 14.

Attached to the governor 12 is a mounting bracket 18 for engagement with an attaching plate 20 of a solenoid 22 so as to provide means for holding the solenoid 22 in position. The solenoid 22 may be of the plunger or rotary type. The core piece 24 is actuated by the solenoid 22 and a seal formed by the packing ring 26 is provided between the core 24 and the solenoid 22. The core 24 is provided with an undercut portion 28 within which an operating lever 30 of the butterfly valve 14 is adapted to be engaged. Thus, upon the actuation of the solenoid 22 the butterfly valve 14 can be actuated so as to open the butterfly valve to permit a maximum flow of fuel to the carburetor 10.

The solenoid 22 is connected by means of a conductor 28 to a switch 30 which is connected to the battery 32 of the vehicle in which this speed control system is installed. The switch 30 is positioned beneath the accelerator pedal 34 of the vehicle so that when the accelerator pedal 34 is depressed fully, or nearly so, the switch 30 will be actuated activating the solenoid 22 and opening the butterfly valve 14 permitting the maximum flow of fuel to the engine. Connected to the switch 30 by means of conductor 34 in a flasher 36 to which lamps 38 and 40 at the front and rear of the vehicle are connected. Hence, upon closing of the switch 30, the lamps 38 and 40 will be flashed. These lamps 38 and 40 can serve as a warning to other motorists or traffic enforcement officials that the vehicle is travelling under a condition where the governor 12 is by-passed.

It is to be recognized that the governor 12 can be adjusted and then can be sealed by various traffic enforcement agencies so as to insure that the vehicle can operate only at a predetermined speed limit unless the switch 30 were to be actuated. Then, the lamps 38 and 40 will indicate whether or not the vehicle is being actuated with the switch 30 depressed thus by-passing the governor 12. Additionally this system would also apply to carburetors incorporating governors or speed control mechanisms within the same casting.

Since from the foregoing the construction and advantages of this speed control system are readily apparent, further description is believed to be unnecessary.

However, since numerous modifications will readily occur to those skilled in the art after a consideration of the foregoing specification and accompanying drawings, it is not intended to limit the invention to the precise construction shown and described, but all suitable modifications and equivalents may be readily resorted to which fall within the scope of the appended claim.

What is claimed as new is as follows:

A speed control system for an engine comprising a governor, said governor having an adjustable valve for controlling the rate of flow of fuel, a switch, a source of electrical power, a solenoid electrically connected to said switch and said source of electrical power and controlled by said switch, means actuated by said solenoid when said switch is closed engaging said valve to open said valve to permit a maximum flow of fuel to an engine, said means including an actuating lever attached to said valve and a plunger having an undercut portion with said lever being received in said undercut portion, said switch being arranged beneath an accelerator pedal, and a signal lamp connected to said source of electrical power and said switch controlled by said switch for providing a visual indication that said governor is being by-passed.

References Cited in the file of this patent

UNITED STATES PATENTS

| | | |
|---|---|---|
| Re. 23,010 | Howard | June 29, 1948 |
| 1,248,130 | Kammerhoff | Nov. 27, 1917 |
| 2,174,062 | Raesler | Sept. 26, 1939 |
| 2,174,972 | Dach | Oct. 3, 1939 |
| 2,230,335 | Smith | Feb. 4, 1941 |
| 2,469,779 | Nowalk | May 10, 1949 |